United States Patent
Li

(10) Patent No.: US 7,117,498 B2
(45) Date of Patent: Oct. 3, 2006

(54) THREAD OPTIMIZATION FOR LOCK AND UNLOCK OPERATIONS IN A MULTI-THREAD ENVIRONMENT

(75) Inventor: Xiao-Feng Li, Ping Ding Shan (CN)

(73) Assignee: Intel Corporation, Santa Clara, CA (US)

( * ) Notice: Subject to any disclaimer, the term of this patent is extended or adjusted under 35 U.S.C. 154(b) by 634 days.

(21) Appl. No.: 10/172,225

(22) Filed: Jun. 14, 2002

(65) Prior Publication Data
US 2003/0233393 A1 Dec. 18, 2003

(51) Int. Cl.
*G06F 9/48* (2006.01)
(52) U.S. Cl. .................. 718/102; 707/8; 707/103 Z
(58) Field of Classification Search ........ 718/100–108; 717/8, 127, 141; 709/223, 229; 707/8, 103 Z
See application file for complete search history.

(56) References Cited

U.S. PATENT DOCUMENTS

| | | | | |
|---|---|---|---|---|
| 5,263,155 A * | 11/1993 | Wang | .................. | 707/8 |
| 5,481,706 A * | 1/1996 | Peek | .................. | 710/200 |
| 5,968,157 A * | 10/1999 | Joy et al. | .................. | 710/200 |
| 6,173,442 B1* | 1/2001 | Agesen et al. | ............... | 717/141 |
| 6,247,025 B1* | 6/2001 | Bacon | .................. | 707/206 |
| 6,317,755 B1* | 11/2001 | Rakers et al. | ............... | 707/204 |
| 6,487,652 B1* | 11/2002 | Gomes et al. | ................. | 712/23 |
| 6,510,460 B1* | 1/2003 | Callsen et al. | ............... | 709/223 |
| 6,622,155 B1* | 9/2003 | Haddon et al. | ............ | 718/100 |
| 6,662,364 B1* | 12/2003 | Burrows et al. | ............ | 718/102 |
| 6,934,933 B1* | 8/2005 | Wilkinson et al. | .......... | 717/121 |
| 6,971,102 B1* | 11/2005 | Kawachiya et al. | ........ | 718/104 |
| 2001/0014905 A1* | 8/2001 | Onodera | .................. | 709/102 |
| 2002/0138544 A1* | 9/2002 | Long | .................. | 709/107 |

* cited by examiner

*Primary Examiner*—Lewis A. Bullock, Jr.
(74) *Attorney, Agent, or Firm*—Blakely, Sokoloff, Taylor & Zafman LLP

(57) ABSTRACT

In one embodiment of the invention, a first reference to a first object is recorded in a first list when a first thread in a multi-thread environment invokes a lock operation on the first object. A thread-safe locking mechanism on the first object in the first list is restored when a second thread is created.

30 Claims, 5 Drawing Sheets

THREAD OPTIMIZATION FOR LOCK AND UNLOCK OPERATIONS IN A MULTI-THREAD ENVIRONMENT

BACKGROUND

1. Field of the Invention

Embodiments of the invention relate to the field of operating systems, and more specifically, to threads.

2. Background

Programming languages that have built-in thread features, such as Java or C#, normally provide associated synchronization mechanisms for coordinating among multiple threads. This necessitates the corresponding Virtual Machine to provide instructions to support the thread synchronization or locking semantics. These thread synchronization and locking semantics are enforced by the run-time system.

For example, in the Java Virtual Machine (JVM) language, the monitorenter/monitorexit instruction is used to implement a synchronized statement in the Java programming language. Each object has an associated monitor. Ownership of a monitor is implemented by a locking mechanism.

Currently, traditional techniques implement locks in a thread-safe manner. In other words, they assume the application has more than one thread. In the lock or monitor implementation, atomic operations are time-consuming operations in the execution path. This is because these operations have little concurrency or parallelism to be exploited. In addition, they need the support and involvement of the processor architecture and the operating system. In a multi-thread environment, a single thread suffers a high overhead in lock and unlock operations.

BRIEF DESCRIPTION OF THE DRAWINGS

The invention may best be understood by referring to the following description and accompanying drawings that are used to illustrate embodiments of the invention. In the drawings.

DESCRIPTION

Figure 1:
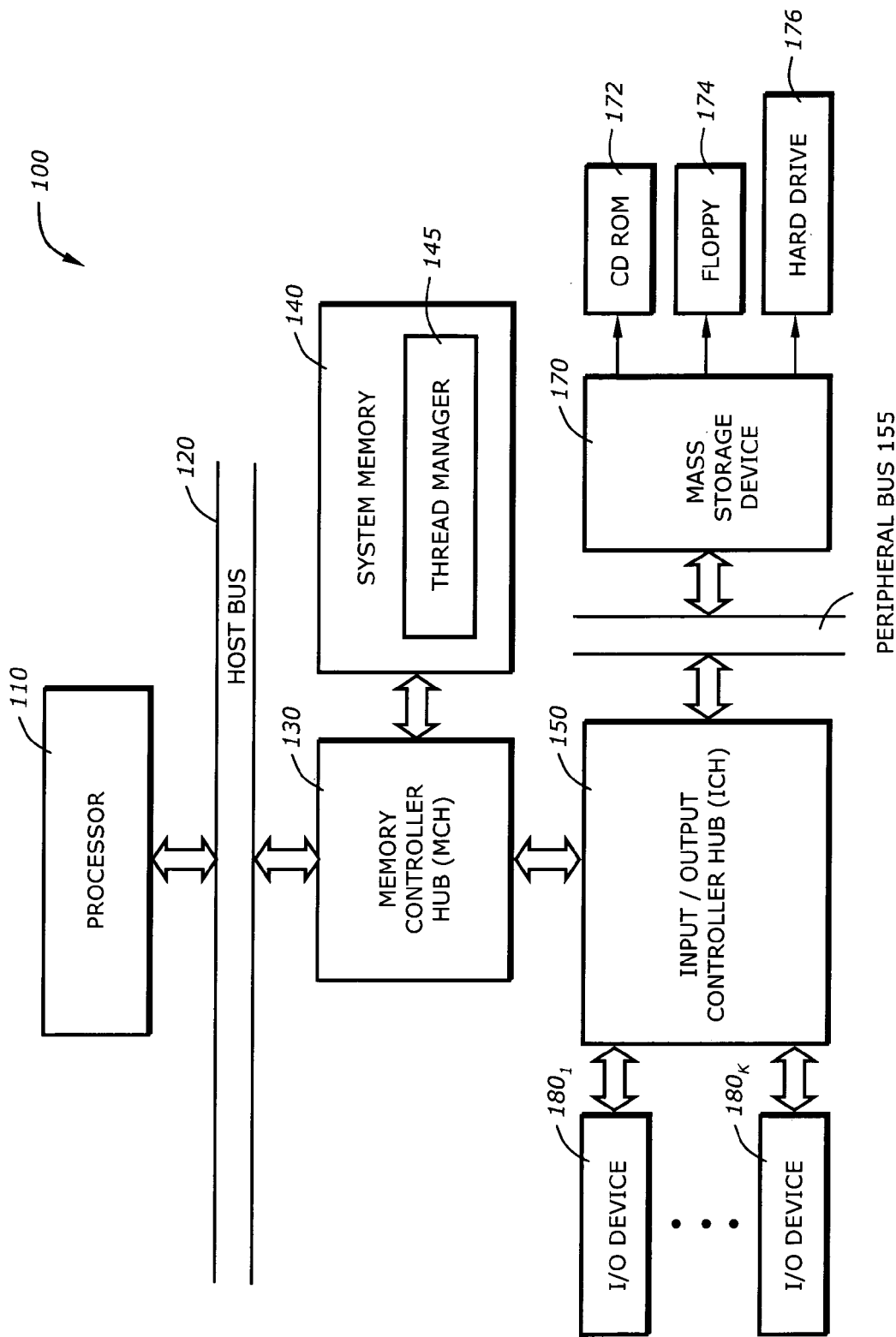
FIG. 1 is a diagram illustrating a system in which one embodiment of the invention can be practiced.

In one embodiment of the invention, a first reference to a first object is recorded in a first list when a first thread in a multi-thread environment invokes a lock operation on the first object. A thread-safe locking mechanism on the first object in the first list is restored when a second thread is created.

In the following description, numerous specific details are set forth. However, it is understood that embodiments of the invention may be practiced without these specific details. In other instances, well-known circuits, structures, and techniques have not been shown in order not to obscure the understanding of this description.

An embodiment of the present invention may be implemented by hardware, software, firmware, microcode, or any combination thereof. When implemented in software, firmware, or microcode, the elements of an embodiment of the present invention are the program code or code segments to perform the necessary tasks. The code may be the actual code that carries out the operations, or code that emulates or simulates the operations. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc. The program or code segments may be stored in a processor readable medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor/machine readable/accessible medium include an electronic circuit, a semiconductor memory device, a read only memory (ROM), a flash memory, an erasable ROM (EROM), a floppy diskette, a compact disk (CD-ROM), an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include data that, when accessed by a machine, cause the machine to perform the operations described in the following. The term "data" here refers to any type of information that is encoded for machine-readable purposes. Therefore, it may include program, code, data, file, etc.

All or part of an embodiment of the invention may be implemented by software. The software may have several modules coupled to one another. A software module is coupled to another module to receive variables, parameters, arguments, pointers, etc. and/or to generate or pass results, updated variables, pointers, etc. A software module may also be a software driver or interface to interact with the operating system running on the platform. A software module may also be a hardware driver to configure, set up, initialize, send and receive data to and from a hardware device.

An embodiment of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

FIG. 1 is a diagram illustrating a system 100 in which one embodiment of the invention can be practiced. The system 100 includes a host processor 110, a host bus 120, a memory control hub (MCH) 130, a system memory 140, an input/output control hub (ICH) 150, a peripheral bus 155, a mass storage device 170, and input/output devices $180_1$ to $180_K$. Note that the system 100 may include more or less elements than these elements.

The host processor 110 represents a central processing unit of any type of architecture, such as embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture.

The host bus 120 provides interface signals to allow the processor 110 to communicate with other processors or devices, e.g., the MCH 130. The host bus 120 may support a uni-processor or multiprocessor configuration. The host bus 120 may be parallel, sequential, pipelined, asynchronous, synchronous, or any combination thereof.

The MCH 130 provides control and configuration of memory and input/output devices such as the system memory 140, and the ICH 150. The MCH 130 may be integrated into a chipset that integrates multiple functionalities such as the isolated execution mode, host-to-peripheral bus interface, memory control. The MCH 130 interfaces to the peripheral bus 155. For clarity, not all the peripheral buses are shown. It is contemplated that the system 100 may also include peripheral buses such as Peripheral Component Interconnect (PCI), accelerated graphics port (AGP), Industry Standard Architecture (ISA) bus, and Universal Serial Bus (USB), etc.

The system memory 140 stores system code and data. The system memory 140 is typically implemented with dynamic random access memory (DRAM) or static random access memory (SRAM). The system memory may include program code or code segments implementing one embodiment of the invention. The system memory includes a thread manager 145 which may include separate elements. Any one of the elements of the thread manager 145 may be implemented by hardware, software, firmware, microcode, or any combination thereof. The system memory 140 may also include other programs or data which are not shown, such as an operating system. The thread manager 145, when executed, causes the processor 110 to perform a number of tasks or operations as described later.

The ICH 150 has a number of functionalities that are designed to support I/O functions. The ICH 150 may also be integrated into a chipset together or separate from the MCH 130 to perform I/O functions. The ICH 150 may include a number of interface and I/O functions such as PCI bus interface to interface to the peripheral bus 155, processor interface, interrupt controller, direct memory access (DMA) controller, power management logic, timer, system management bus (SMBus), universal serial bus (USB) interface, mass storage interface, low pin count (LPC) interface, etc.

The mass storage device 170 stores archive information such as code, programs, files, data, applications, and operating systems. The mass storage device 170 may include compact disk (CD) ROM 172, floppy diskettes 174, and hard drive 176, and any other magnetic or optic storage devices. The mass storage device 170 provides a mechanism to read or access machine-readable media. The machine-readable media may contain computer readable program code to perform tasks as described in the following. These tasks may include recording a first reference to a first object in a first list, restoring a thread-safe locking mechanism on the first object in the first list, removing the first reference from the first list, etc.

The I/O devices $180_1$ to $180_K$ may include any I/O devices to perform I/O functions. Examples of I/O devices $180_1$ to $180_K$ include controller for input devices (e.g., keyboard, mouse, trackball, pointing device), media card (e.g., audio, video, graphics), and any other peripheral controllers.

In a multi-thread environment, when a thread A attempts to gain ownership of an object, it determines if the object is locked. If the object is locked because it is being used or owned by another thread B, thread A has to wait until the object is unlocked or released. If the object is not locked, thread A can obtain ownership of the object and locks the object. The lock and unlock operations are elements of a synchronization mechanism to resolve contention of access or ownership of an object. These synchronization primitives are basic constructs in a threading system and have significant impact on the system performance. It is, therefore, desirable to implement these primitives in an efficient manner. It is noted that in a multi-thread environment, there are intervals during which there is only one thread running in the system. The thread may obtain ownership and release ownership of an object or many objects several times. If a complete implementation of locking and unlocking operations is used, the overhead may be quite significant, resulting in inefficient use of resources.

One embodiment of the invention defers the actual locking and unlocking until necessary. This may be implemented by using a lazy list to record the object, when a thread invokes a lock operation, without actually locking it by a thread-safe mechanism. The recorded object is removed when the thread invokes an unlock operation without actually unlocking it by a thread-safe mechanism. When another thread attempts to access this object, the thread-safe lock operation can now be performed. Since a thread may lock and unlock an object several times, merely recording or removing the object in the list without actually performing the lock and unlock thread-safe operations, significant processing time can be saved.

Figure 2:
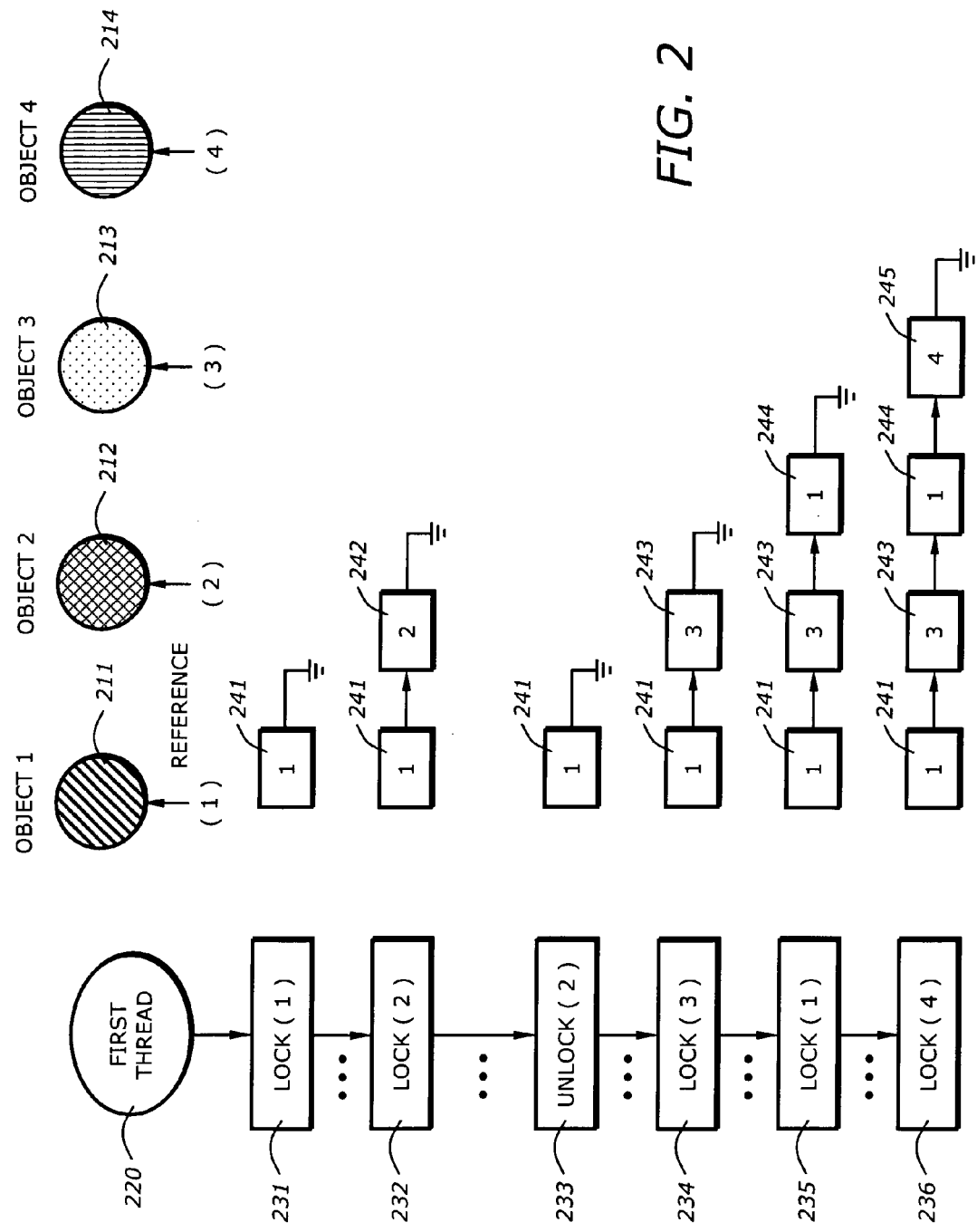
FIG. 2 is a diagram illustrating a scenario when a thread invokes lock and unlock operations according to one embodiment of the invention.

FIG. 2 is a diagram illustrating a scenario when a thread invokes lock and unlock operations according to one embodiment of the invention. This scenario includes a first thread 220, four objects: object1 211, object2 212, object3 213, and object4 214. Denote (k) as a reference to the object k. For example, (1) is a reference to object1 211.

The first thread 220 invokes a sequence of lock and unlock operations: lock(1) 231, lock(2) 232, unlock(2) 233, lock(3) 234, lock(1) 235, and lock(4) 236. In this scenario, the first thread 220 is the only thread running in the system.

When the first thread 220 invokes lock(1) 231, a reference 241 to object1 211 is recorded in a list. The list may be implemented by an array, a linked list, a stack, or any other suitable data structure. The list may also be implemented by hardware using a memory device with searching and matching abilities, such as a content addressable memory (CAM), or an associative memory. No actual locking is performed when the reference is stored or recorded in the list. When the first thread 220 invokes lock(2) 232, a reference 242 to object2 212 is added to the list. When the first thread 220 invokes unlock(2), the reference 242 is removed from the list. When the first thread 220 invokes lock(3) 234, a reference 243 to object3 213 is recorded in the list. When the first thread 220 invokes the lock(3) 235, a reference 244 to object1 211 is recorded in the list. Alternatively, a check on the list shows that a reference to object1 211 has already been recorded in the list (reference 241), and the reference 244 may not need to be recorded. When the first thread 220 invokes the lock(4) 236, a reference 245 to object4 214 is recorded in the list.

The thread manager 145 maintains such a list of objects as they are locked and unlocked. When another thread attempts to access or gain ownership of an object, the thread manager 145 may begin a thread-safe mechanism to perform the actual lock or unlock operations as appropriate.

To further reduce the overhead, the thread manager 145 may determine if the object to be accessed has been recorded in the list of the first thread 220. If not, a second list associated with the second thread may be created to contain the objects exclusive to the second thread. This operation may be thread-safe atomic to ensure that the object or objects may not be added into the first list by the first thread. The process is repeated for a third thread, fourth thread, etc. In general, when an object k is accessed by a thread j in N threads 1 through N, it is determined if this object has been recorded in the lists associated with all other threads. If the objects is not recorded in any other list, it can be recorded in the list associated with thread j. Otherwise, control is transfer to a thread-safe mechanism as currently existing in the operating system or language environment.

Figure 3:
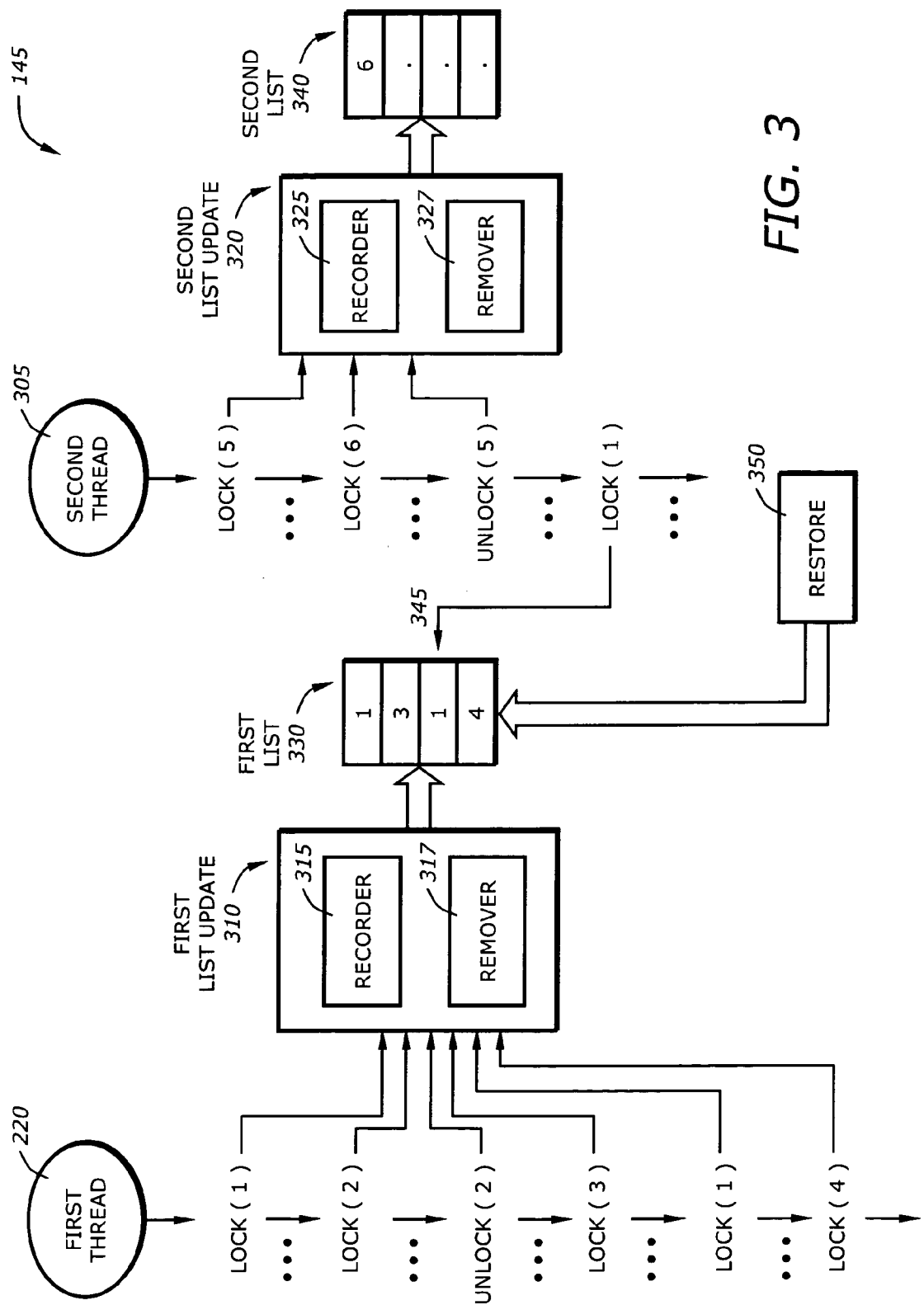
FIG. 3 is a diagram illustrating a thread manager according to one embodiment of the invention.

FIG. 3 is a diagram illustrating the thread manager 145 shown in FIG. 1 according to one embodiment of the invention. For illustrative purposes, only two threads are shown. As is known by one skilled in the art, the technique can be extended to any number of threads. The thread manager 145 includes the first thread 220, a second thread 305, a first list update 310, a first list 330, a second list update 320, a second list 340, and a restore 350.

The first thread 220 invokes lock(1), lock(2), unlock(2), lock(3), lock(1), and lock(4) as illustrated in FIG. 2. The second thread 305 invokes lock(5), lock(6), unlock(5), and lock(1).

The first list update 310 includes a recorder 315 and a remover 317. The recorder 315 records a reference to an object k in the first list 330 when the first thread 220 invokes lock(k) as illustrated in FIG. 2. The remover 317 removes the reference from the first list 330 when the first thread 220 invokes an unlock operation on the object j to object j. Similarly, the second list update 320 includes a recorder 325 and a remover 327. The recorder 325 records a reference to an object k in the second list 340 when the second thread 305 invokes lock(k) as illustrated in FIG. 2. The remover 327 removes the reference to object j from the second list 340 when the second thread 305 invokes an unlock operation on the object j.

The restore 350 restores a thread-safe locking mechanism on the object k in the first list when the second thread 305 is created. To further reduce the operating time, it is determined if the second thread 305 attempts to access the object in the first list 330 via a search, match, or comparison path 345. The search can be performed efficiently when the first list 330 is implemented by a CAM. If the object is not in the first list 330, it can be recorded in the second list 340. If the object is in the first list 330, the restore 350 may then begin the thread-safe mechanism.

Figure 4:
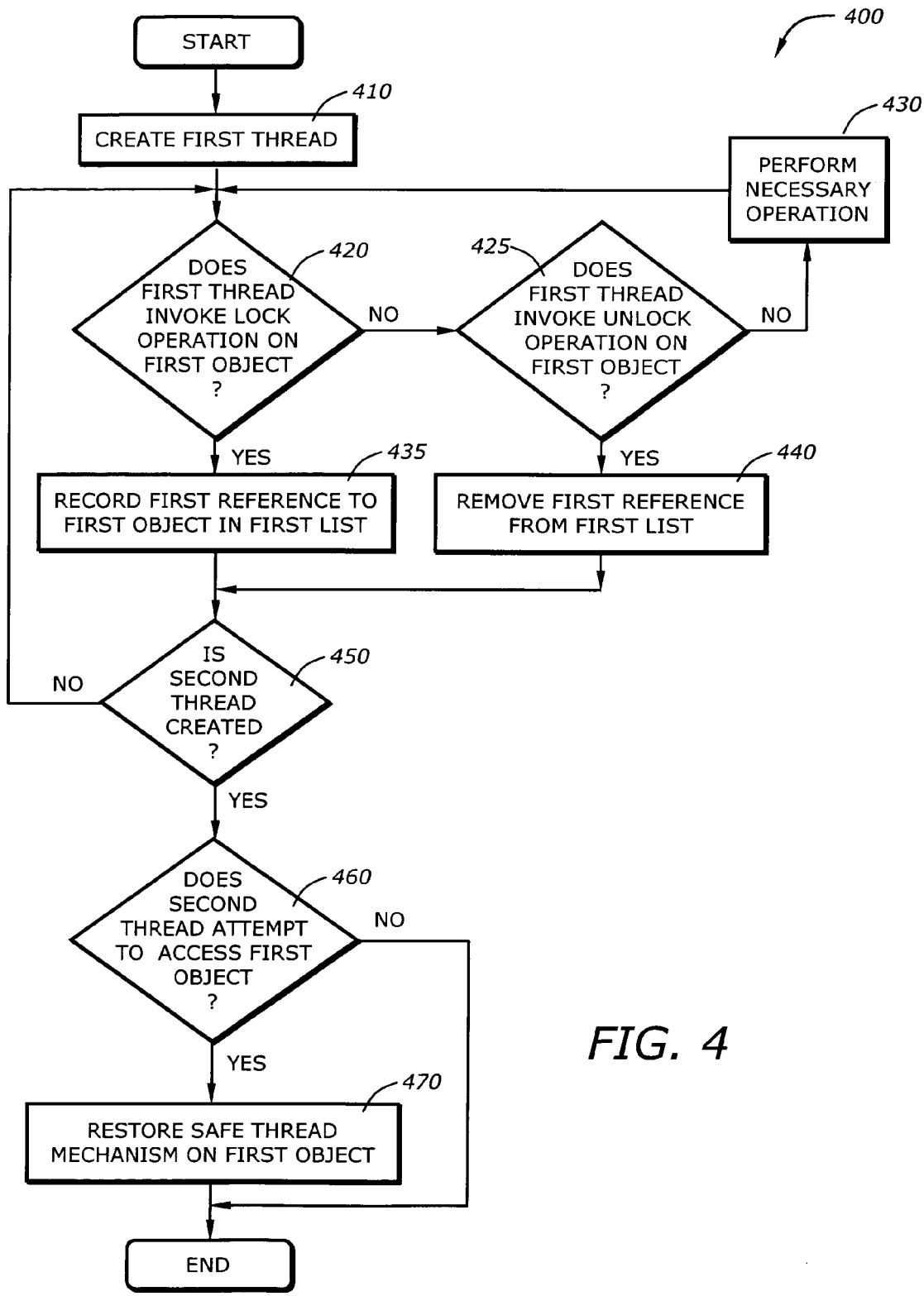
FIG. 4 is a flowchart illustrating a process to manage threads according to one embodiment of the invention.

FIG. 4 is a flowchart illustrating a process 400 to manage threads according to one embodiment of the invention.

Upon START, the process 400 creates a first thread (Block 410). Then, the process 400 determines if the first thread invokes a lock operation on a first object (Block 420). If not, the process 400 determines if the first thread invokes an unlock operation on the first object (Block 425). If not, the process 400 proceeds to perform the necessary operations (Block 430) and goes back to Block 420. If the first thread invokes a lock operation, the process 400 records a first reference to the first object in a first list (Block 435). If the first thread invokes an unlock operation, the process 400 removes the first reference from the first list (Block 440).

Next, the process 400 determines if a second thread is created (Block 450). If not, the process 400 returns back to Block 420 to continue checking the first thread. Otherwise, the process 400 determines if the second thread attempts to access the first object recorded in the first list (Block 460). If not, the process 400 is terminated or returns back to Block 420 to continue monitoring the operations invoked by the first thread. If the second thread attempts to access the first object, the first thread restores thread-safe mechanism on the first list. The restoring may involve the actual corresponding lock or unlock operations. Then, the process 400 is terminated or goes back to Block 420 to continue monitoring the thread activities.

Figure 5:
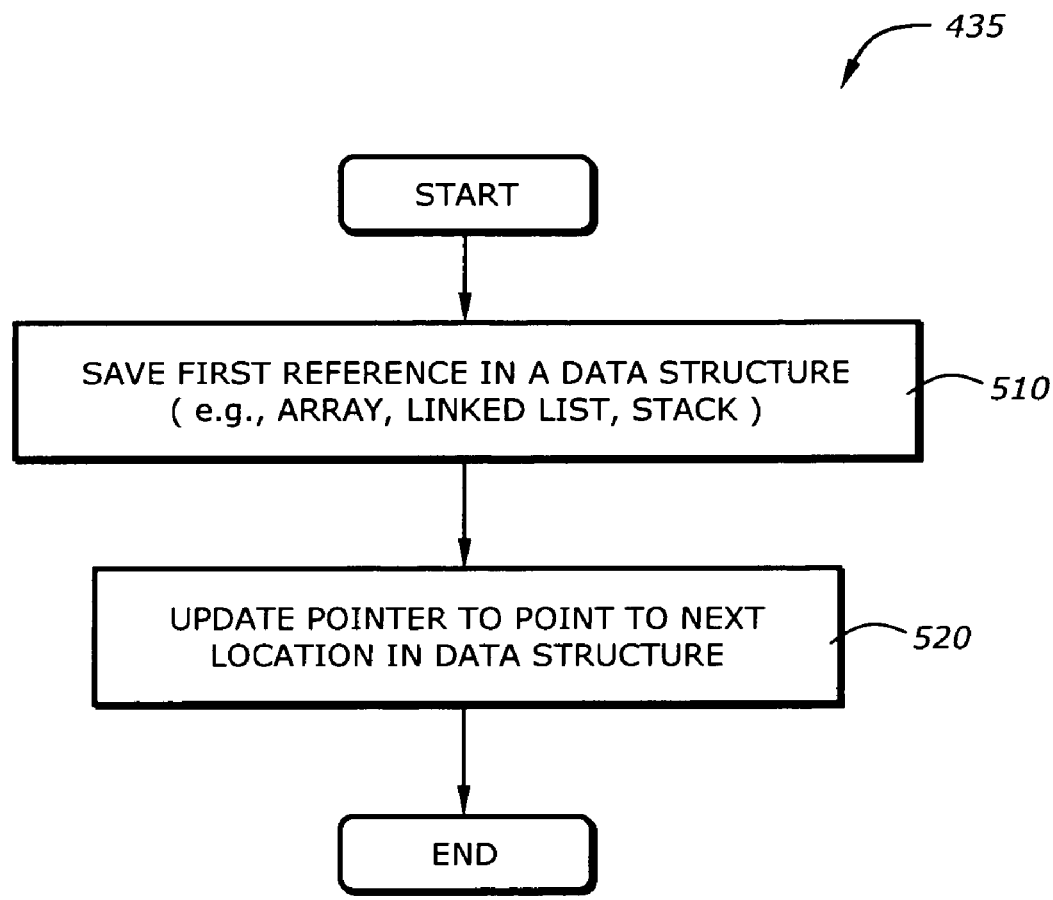
FIG. 5 is a flowchart illustrating a process to record a reference to objects in a list according to one embodiment of the invention.

FIG. 5 is a flowchart illustrating the process 435 to record a reference to object in a list according to one embodiment of the invention.

Upon START, the process 435 saves the first reference in the list which may be implemented by a data structure or a memory (Block 510). The data structure may be an array, a linked list, or a stack. The memory may be a static RAM, a dynamic RAM, or a CAM. Then, the process 435 updates a pointer to point to the next location in the data structure (Block 520). When the list is implemented by CAM, no pointer is necessary because the CAM is able to locate an available entry to save the first reference. Then, the process 435 is terminated.

The implementation of the thread manager 145 may be described by the following pseudo code. In the following pseudo code, the list is implemented in an array.

```
object *lazy_list[max_lock_num]
int lazy_lock_num = 1;
/* Lock operation */
void lock(object* obj) {
    lazy_list[lazy_lock_num++] = obj;
}
/* Unlock operation */
void unlock(object* obj){
    lazy_lock_num--;
}
/* first version: lock the recorded objects before second thread locks any object
*/
void lock_lazily1(){
    revive_threadsafe_lock();
```

```
            for (int i=0, i<lazy_lock_num;i++){
                lock(lazy_list[i]);
            }
    }
    /* second version: lock the recorded object if it is not private to one thread*/
    void lock_lazily2(){
        for (int i=0; i<lazy_lock_num; i++){
            if (lazy_list[i] not private to one thread){
                threadsafe_lock(lazy_list[i]);
            }
        }
    }
```

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
    recording a first reference to a first object in a first list when a first thread in a multi-thread environment invokes a lock operation, without actually locking, on the first object; and
    restoring a thread-safe locking mechanism on the first object in the first list when a second thread is created.

2. The method of claim 1 further comprising:
    removing the first reference from the first list when the first thread invokes an unlock operation, without actually unlocking, on the first object.

3. The method of claim 2 wherein recording the first reference comprises:
    storing the first reference in a data structure; and
    updating a pointer to the data structure to point to a next location in the data structure.

4. The method of claim 3 wherein removing comprises:
    updating the pointer to the data structure to bypass the first reference.

5. The method of claim 4 wherein storing the first reference comprises:
    storing the first reference in one of an array, a linked list, and a stack.

6. The method of claim 1 further comprising:
    determining if the second thread attempts to access the first object.

7. The method of claim 6 wherein restoring the thread-safe locking mechanism on the first object comprises:
    restoring the thread-safe locking mechanism on the first object if the second thread attempts to access the first object.

8. The method of claim 7 further comprising:
    recording a second reference to a second object in a second list when the second thread invokes the lock operation, without actually locking, on the second object, the second reference being absent in the first list; and
    restoring the thread-safe locking mechanism on the second object in the second list when one of the first thread and a third thread attempts to access the second object.

9. The method of claim 8 further comprising:
    removing the second reference from the second list when the second thread invokes an unlock operation, without actually unlocking, on the second object.

10. The method of claim 8 wherein restoring comprises:
    performing one of a safe lock operation and a safe unlock operation using an atomic operation.

11. An article of manufacture comprises:
    a machine-accessible medium including data that, when accessed by a machine, causes the machine to:
    record a first reference to a first object in a first list when a first thread in a multi-thread environment invokes a lock operation, without actually locking, on the first object; and
    restore a thread-safe locking mechanism on the first object in the first list when a second thread is created.

12. The article of manufacture of claim 11 wherein the machine-accessible medium further comprises data that, when accessed by the machine, causes the machine to:
    remove the first reference from the first list when the first thread invokes an unlock operation, without actually unlocking, on the first object.

13. The article of manufacture of claim 12 wherein the data causing the machine to record the first reference comprises data, when accessed by the machine, causes the machine to:
    store the first reference in a data structure; and
    update a pointer to the data structure to point to a next location in the data structure.

14. The article of manufacture of claim 13 wherein the data causing the machine to remove comprises data, when accessed by the machine, causes the machine to:
    update the pointer to the data structure to bypass the first reference.

15. The article of manufacture of claim 14 wherein the data causing the machine to store the first reference comprises data, when accessed by the machine, causes the machine to:
    store the first reference in one of an array, a linked list, and a stack.

16. The article of manufacture of claim 11 wherein the machine-accessible medium further comprises data that, when accessed by the machine, causes the machine to:
    determine if the second thread attempts to access the first object.

17. The article of manufacture of claim 16 wherein the data causing the machine to restore the thread-safe locking mechanism on the first object comprises data, when accessed by the machine, causes the machine to:
    restore the thread-safe locking mechanism on the first object if the second thread attempts to access the first object.

18. The article of manufacture of claim 17 wherein the machine-accessible medium further comprises data that, when accessed by the machine, causes the machine to:

record a second reference to a second object in a second list when the second thread invokes the lock operation, without actually locking, on the second object, the second reference being absent in the first list; and restore the thread-safe locking mechanism on the second object in the second list when one of the first thread and a third tread attempts to access the second object.

19. The article of manufacture of claim 18 wherein the machine-accessible medium further comprises data that, when accessed by the machine, causes the machine to:

remove the second reference from the second list when the second thread invokes an unlock operation, without actually unlocking, on the second object.

20. The article of manufacture of claim 18 wherein the data causing the machine to restore comprises data, when accessed by the machine, causes the machine to:

perform one of a safe lock operation and a safe unlock operation using an atomic operation.

21. A system comprising:

a processor; and a memory coupled to the processor to store a thread manager, the thread manager when executed, causing the processor to:

record a first reference to a first object in a first list when a first thread in a multi-thread environment invokes a lock operation, without actually locking, on die first object; and restore a thread-safe locking mechanism on the first object in the first list when a second thread is created.

22. The system of claim 21 wherein the thread manager when executed, further causing the processor to:

remove the first reference from the first list when the first thread invokes an unlock operation, without actually unlocking, on the first object.

23. The system of claim 22 wherein the thread manager causing the processor to record causes the processor to:

store the first reference in a data structure; and update a pointer to the data structure to point to a next location in the data structure.

24. The system of claim 23 wherein the thread manager causing the processor to remove causes the processor to:

update the pointer to the data structure to bypass the first reference.

25. The system of claim 24 wherein the thread manager when executed, causing the processor to causes the processor to score the first reference, causes the processor to:

store the first reference in one of an army, a linked list, and a stack.

26. The system of claim 21 the thread manager when executed, further causing the processor to:

determine if the second thread attempts to access the first object.

27. The system of claim 26 wherein the thread manager causing the processor to restore the thread-safe locking mechanism on the first object causes the processor to:

restore the thread-safe locking mechanism on the first object if the second thread attempts to access the first object.

28. The system of claim 27 wherein the thread manager when executed, further causes the processor to:

record a second reference to a second object in a second list when the second thread invokes the lock operation, without actually locking, on the second object, the second reference being absent in the first list; and restore the thread-safe locking mechanism on the second object in the second list when one of the first thread and a third thread attempts to gain access to the second object.

29. The system of claim 28 wherein the thread manager further causes the processor to:

remove the second reference from the second list when the second thread invokes an unlock operation, without actually unlocking, on the second object.

30. The system of claim 28 wherein the thread manager causing the processor to restore the thread-safe locking mechanism on the first object causes the processor to:

perform one of a safe lock operation and a safe unlock operation using an atomic operation.

* * * * *